(12) United States Patent
Looney et al.

(10) Patent No.: US 8,700,364 B2
(45) Date of Patent: Apr. 15, 2014

(54) COMPUTER BASED MODELS FOR WEBS OF MATERIALS

(75) Inventors: Michael Timothy Looney, Blue Ash, OH (US); Lei Li, Mason, OH (US); Mark David Whaley, Liberty Township, OH (US); Stephen Joseph Lange, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 373 days.

(21) Appl. No.: 13/154,530

(22) Filed: Jun. 7, 2011

(65) Prior Publication Data

US 2012/0316839 A1 Dec. 13, 2012

(51) Int. Cl.
*G06F 17/50* (2006.01)

(52) U.S. Cl.
USPC ............. 703/2; 703/5; 703/7; 703/9; 703/11; 700/86; 152/154.2

(58) Field of Classification Search
USPC ............ 703/2, 5, 7, 9, 11; 700/86; 152/154.2
See application file for complete search history.

(56) References Cited

U.S. PATENT DOCUMENTS

| | | | | |
|---|---|---|---|---|
| 3,795,474 A | * | 3/1974 | Heyer | 425/325 |
| 4,640,742 A | * | 2/1987 | Helleur | 162/212 |
| 5,364,258 A | * | 11/1994 | Buckley et al. | 425/501 |
| 5,827,392 A | * | 10/1998 | Buckley et al. | 156/275.3 |
| 6,149,751 A | * | 11/2000 | Marschke | 156/205 |
| 2004/0154715 A1 | * | 8/2004 | Dufournier | 152/154.2 |
| 2006/0155398 A1 | * | 7/2006 | Hoffberg et al. | 700/86 |

* cited by examiner

*Primary Examiner* — Thai Phan
(74) *Attorney, Agent, or Firm* — Christian M. Best; Charles R. Ware

(57) ABSTRACT

Methods of using computer based models for simulating the physical behavior of webs.

29 Claims, 13 Drawing Sheets

COMPUTER BASED MODELS FOR WEBS OF MATERIALS

CROSS-REFERENCE TO RELATED APPLICATION

This application claims priority to U.S. provisional application 61/352,099, filed Jun. 7, 2010, which is hereby incorporated by reference.

FIELD

In general, embodiments of the present disclosure relate to computer based models for webs of material. In particular, embodiments of the present disclosure relate to methods of using computer based models for simulating the physical behavior of a web as the web moves and interacts with a contact surface.

BACKGROUND

It can be difficult to predict the physical behavior of a web as the web moves and interacts with a contact surface.

SUMMARY

However, embodiments of the present disclosure can at least assist in predicting the physical behavior of a web. The present disclosure includes methods of simulating the physical behavior of a web as the web moves and interacts with a contact surface. As a result, the web, the contact surface, and the process for moving the web can be evaluated and modified as computer based models before they are tested as real world things.

DETAILED DESCRIPTION

Figure 1:
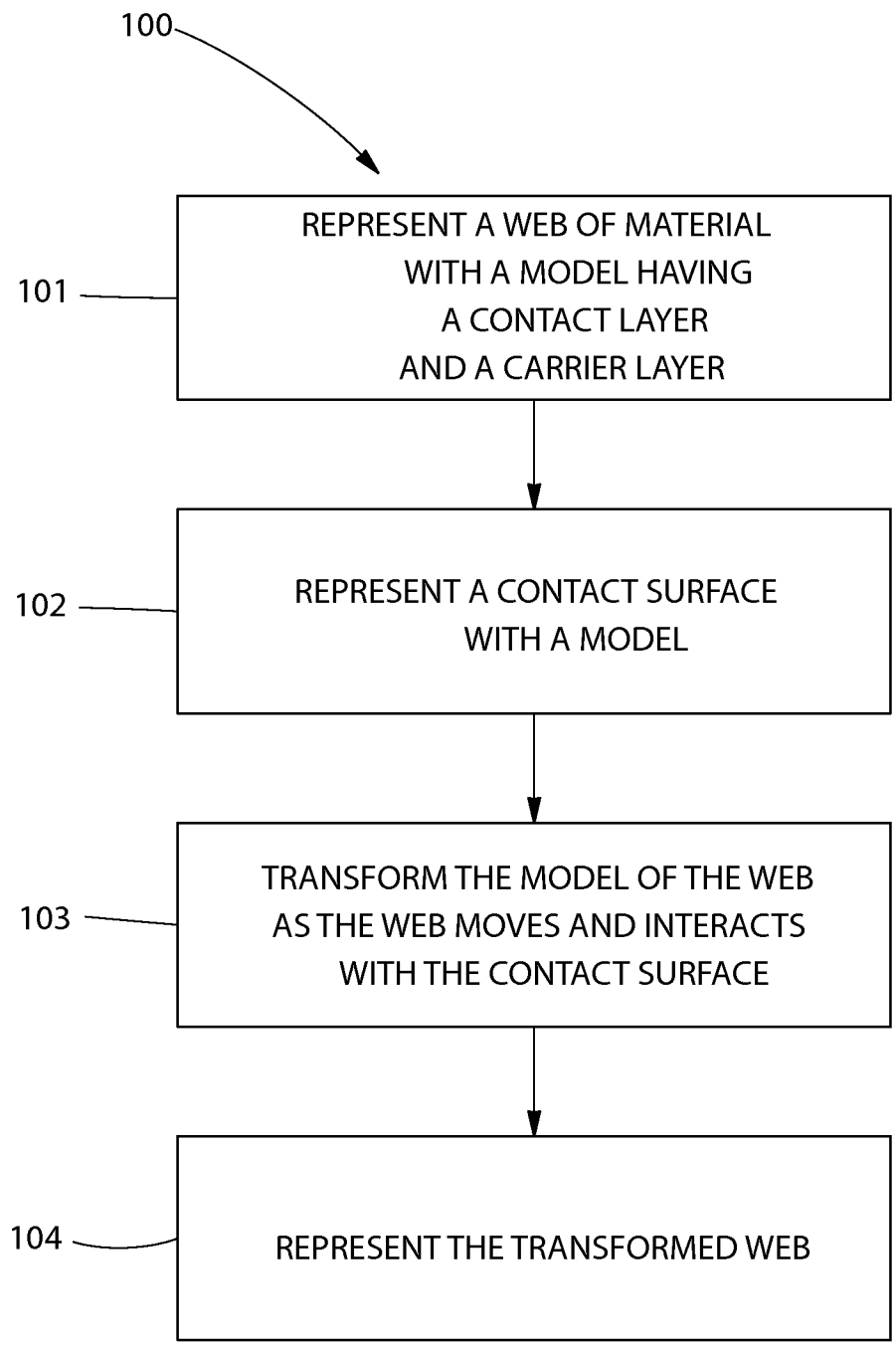
FIG. 1 is a chart illustrating a method of using computer based models for simulating the physical behavior of a web as the web moves and interacts with a contact surface.

The present disclosure includes methods of simulating the physical behavior of a web. Embodiments of the present disclosure can at least assist in predicting the physical behavior of a web as the web moves and interacts with a contact surface. As a result, the web, the contact surface, and the process for moving the web can be evaluated and modified as computer based models before they are tested as real world things.

Computer aided engineering (CAE) is a broad area of applied science in which technologists use software to develop computer based models that represent real world things. The models can be transformed to provide various information about the physical behavior of those real world things, under certain conditions and/or over particular periods of time. With CAE, the interactions of the computer based models are referred to as simulations. Sometimes the real world things are referred to as a problem and the computer based model is referred to as a solution. There are several major categories of CAE.

Finite element analysis (FEA) is a major category of CAE. In FEA, models representing mechanical articles, as well as their features, components, structures, and/or materials are transformed to predict stress, strain, displacement, deformation, and other mechanical behaviors. FEA represents a continuous solid material as a set of discrete elements. In FEA, the mechanical behavior of each element is calculated, using equations that describe mechanical behavior. The results of all of the elements are summed up, to represent the mechanical behavior of the material as a whole.

Commercially available software can be used to conduct CAE. Abaqus, from SIMULIA in Providence, R.I., and LSDyna from Livermore Software Technology Corp. in Livermore, Calif., are examples of commercially available FEA software. Alternatively, CAE software can be written as custom software. CAE software can be run on various computer hardware, such as a personal computer, a minicomputer, a cluster of computers, a mainframe, a supercomputer, or any other kind of machine on which program instructions can execute to perform CAE functions.

CAE software can be used to represent a number of real world things, such as a web of material. For example, a web can be represented by a computer based model of the web. Thus, CAE can be used to design, simulate, and/or evaluate the features, performance, and/or interactions of the web. This modeling can be used for any kind of web known in the art, including any kind of web disclosed herein.

CAE software can also be used to represent a contact surface, such as the contact surface of a roller. For example, a roller can be represented by a computer based model of the roller. Thus, CAE can be used to design, simulate, and/or evaluate the features, performance, and/or interactions of the roller. This modeling can be used for any kind of roller known in the art, including any kind of roller disclosed herein.

Any and all of the methods of the present disclosure that use computer based models can be represented as program instructions for causing a device to perform a method, and such instructions can be stored on any form of computer readable medium known in the art. Such instructions can also be stored and used as part of a computer-based system.

FIG. 1 is a chart illustrating a method 100 of steps 101-104 for using computer based models for simulating the physical behavior of a web as the web moves and interacts with a contact surface. Although the steps 101-104 are described in numerical order in the present disclosure, in various embodiments some or all of these steps can be performed in other orders, and/or at overlapping times, and/or at the same time, as will be understood by one of ordinary skill in the art.

The method 100 includes a first step 101 of representing a web of material with a computer based model of at least a portion of the web. The material can be any type of solid material that can move and interact with a contact surface. A web can have various dimensions for its length, width, and thickness.

The model includes a first web contact layer. A contact layer represents a surface of the web. The first web contact layer includes first contact objects. The model also includes a carrier layer with carrier elements. The first web contact layer is joined to the carrier layer. The model can also include a second web contact layer, opposite the first contact layer, with second contact objects. The second web contact layer can also be joined to the carrier layer. In various embodiments, the model of the web can also include additional layers. The model of the web can be created as described in connection with the embodiments of FIGS. 2E-2H.

The method 100 includes a second step 102 of representing a first contact surface with a computer based model of at least a portion of the first contact surface. A contact surface represents a surface of an object that is configured for contact with the web. The contact surface can be any type of solid surface that can interact with a web of material, such as a surface of: a roller, a conveyor, a folding board, a web guide, etc. Contact surfaces can have various sizes and shapes. For example, a contact surface can be convex or concave, with respect to the web. In various embodiments, additional contact surfaces can also be represented.

Prior to or during the third step 103, the model of the web and the model of the contact surface can be brought together. In one embodiment, the model of the web can be brought together with model of the contact surface to simulate a real world start-up process, such as the threading of a web over a roller in a machine. In another embodiment, the model of the web can be brought together with the model of the contact surface before the simulation is begun to simulate a real world running condition, after a start-up process has been completed.

The method 100 includes a third step 103 of transforming the computer based model of the web from step 101, by modeling a physical behavior of the web as the web moves, and as at least a portion of the web interacts with at least a portion of the first contact surface from step 102, to form a transformed web. The transforming of the third step 103 can include one or more of various forms of interaction, such as mechanical interaction, fluid-structure interaction, electrostatic interaction, magnetic interaction, thermal interaction, or other interactions based on various kinds of forces and/or conditions.

In the transforming of the third step 103, FEA program instructions can execute to simulate the movement of the web of material from the first step 101 with respect to a frame of reference and the interaction between the model of the web and the model of the first contact surface of the second step 102. However, the present disclosure contemplates that, in an alternate embodiment, part, or parts, or all of the third step 103 can be performed using another kind of computer based program instructions, as will be understood by one of skill in the art.

The simulation of the third step 103 transforms the model of the web to form a computer based model that represents a transformed web. The simulation of the third step 103 deforms the web and changes the position of the web with respect to its frame of reference. The simulation of the third step 103 is based on boundary conditions.

Boundary conditions are defined variables that represent physical factors acting within a computer based model. Examples of boundary conditions include forces, pressures, velocities, displacements, and other physical factors. Each boundary condition can be assigned a particular magnitude, direction, location, and duration within the model. These values can be determined by observing, measuring, analyzing, and/or estimating real world physical factors. In various embodiments, computer based models can also include one or more boundary conditions that differ from real world physical factors, in order to account for inherent limitations in the models and/or to more accurately represent the overall physical behaviors of real world things, as will be understood by one of ordinary skill in the art. Boundary conditions can act on the model in various ways, to move, constrain, and/or deform one or more parts in the model.

The method 100 includes a fourth step 104 of representing the web as it has been transformed by the third step 103. The representation of the fourth step 104 can be provided on a graphical display and/or as an output of data, on a display screen, as electronic data, or in printed form, or in some other way, as will be understood by one of ordinary skill in the art.

In some embodiments of the method 100, one or more environmental objects and/or environmental conditions can physically interact with part, or parts, or all of the model of the web of the first step 101, as described herein, during the third step 103 and/or before, during, or after any of the other steps. For example, during the transforming of the third step 103, a model of the ambient atmosphere can physically interact with the model of the web.

Figure 2A:
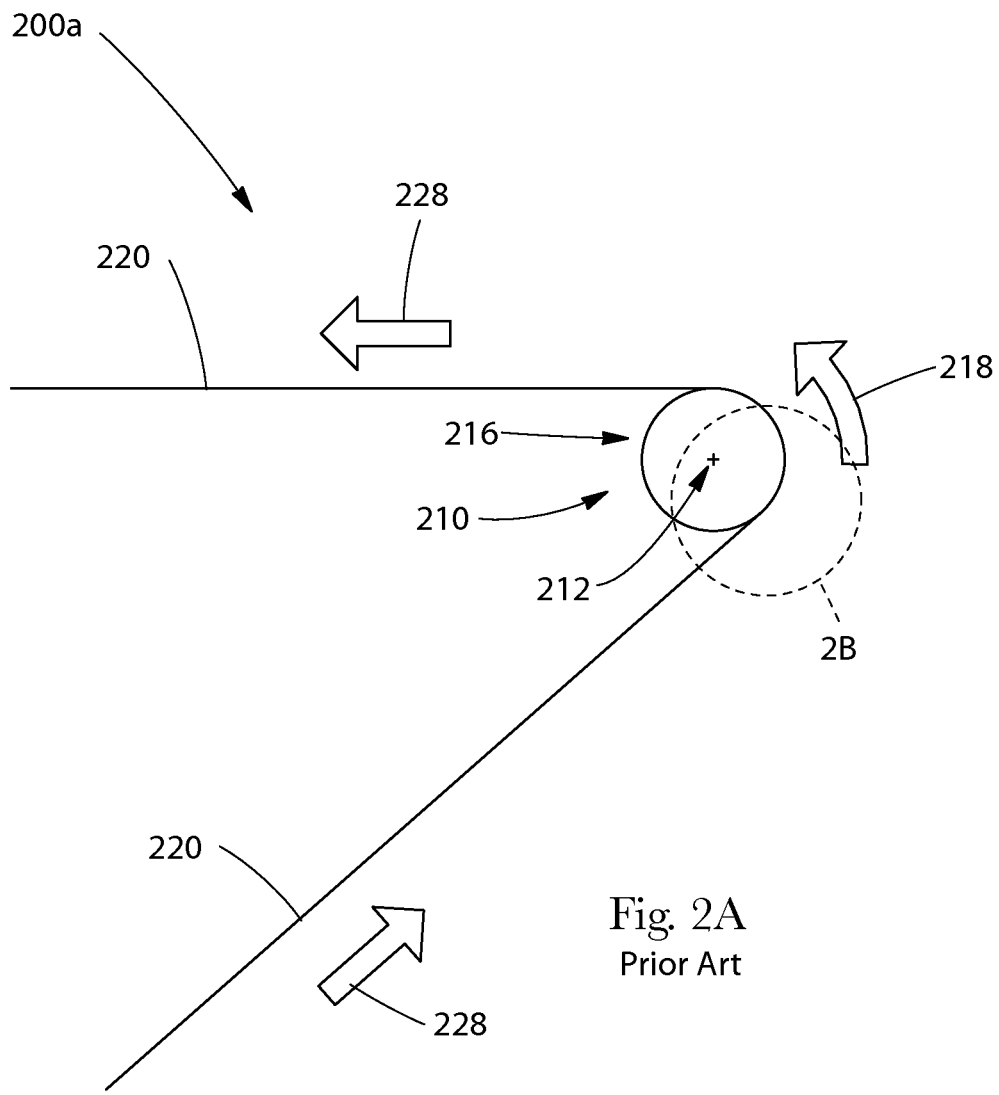
FIG. 2A is a side view illustrating a web moving and interacting with a contact surface on a roller.

FIG. 2A is a side view illustrating a set-up 200a with a web of material 220 moving with a velocity 228 and interacting with a contact surface 216 on a roller 210 as the roller 210 rotates around an axis 212 with an angular velocity 218.

The embodiment of FIG. 2A can be varied in many ways, as will be understood by one of skill in the art. The web 220 can be any kind of web, in any configuration known in the art, including any configuration described herein. The web can be a continuous piece of material or the web can be a closed loop of material. The web can be any kind of sheet, ribbon, belt, rope, string, strand, or any other kind of web, or a composite of one or more of any of these, joined together in any way. The web can be of any size and shape. The web can be of any length, any width, and any thickness, any of which can be uniform or variable in the machine direction and/or the cross-direction over part, parts, or all of the web. The web can be made of any material. For example, the web can be made of foil, metal, paper, textile, nonwoven, plastic, film, wire, etc. Part, parts, or all of the web can also be made of multiple materials, joined together in any way. For example, the web can be a laminate with a film layer and a nonwoven layer. The surface of the web can be continuous or discontinuous, over part, parts, or all of the web. For example, a web with a discontinuous surface can be a perforated web with holes through its thickness. Part, parts, or all of either or the surfaces of the web can be smooth, or be textured, or can have recesses, or can have protrusions, or any combination of any of these. Any of the variations described above and any other variations known in the art can be combined in any way, with any embodiment of a machine, in any of the embodiments described herein. In an alternate embodiment of FIG. 2A, the web 220 can be replaced with anything that can interact with a contact surface.

The roller 210 can be any kind of roller, in any configuration known in the art, including any configuration described herein. The roller can be driven or undriven. The roller can be any kind of caster, pulley, sheave, wheel, or any other kind of roller. The roller can be a ball roller, cam roller, conveyor roller, guide roller, track roller, web roller, wheel roller, or any other kind of roller. The roller can be of any size and shape. The roller can be of any width and diameter, either of which can be uniform or variable over part, parts, or all of the roller. The roller can be made of any material. For example, the roller can be made of ceramic, metal, plastic, rubber, etc. Part, parts, or all of the roller can also be made of multiple materials, joined together in any way. For example, the roller can be a metal roller with a rubber coating on its roll face. Part, parts, or all of the roller can be hollow or solid. The surfaces of the roller can be continuous or discontinuous, over part, parts, or all of the roller. For example, the roller can have one or more grooves on its surface. Part, parts, or all of the surfaces of the roller can be smooth, or be textured, or can have holes, or can have recesses, or can have protrusions, or any combination of any of these. Any of the variations described above and any other variations known in the art can be used in any way, with any embodiment of a web, and can be combined in any way, within any embodiment of machine, in any of the embodiments described herein. In an alternate embodiment of FIG. 2A, the roller 210 can be replaced with any object that has a contact surface.

Throughout the present disclosure, the real-world embodiments are described and illustrated with the web configured as a sheet-like material and the roller configured as a cylindrical roller, however this particular configuration is not required; the web and the roller can each be in any configuration known in the art, including any configuration disclosed herein.

Figure 2B:
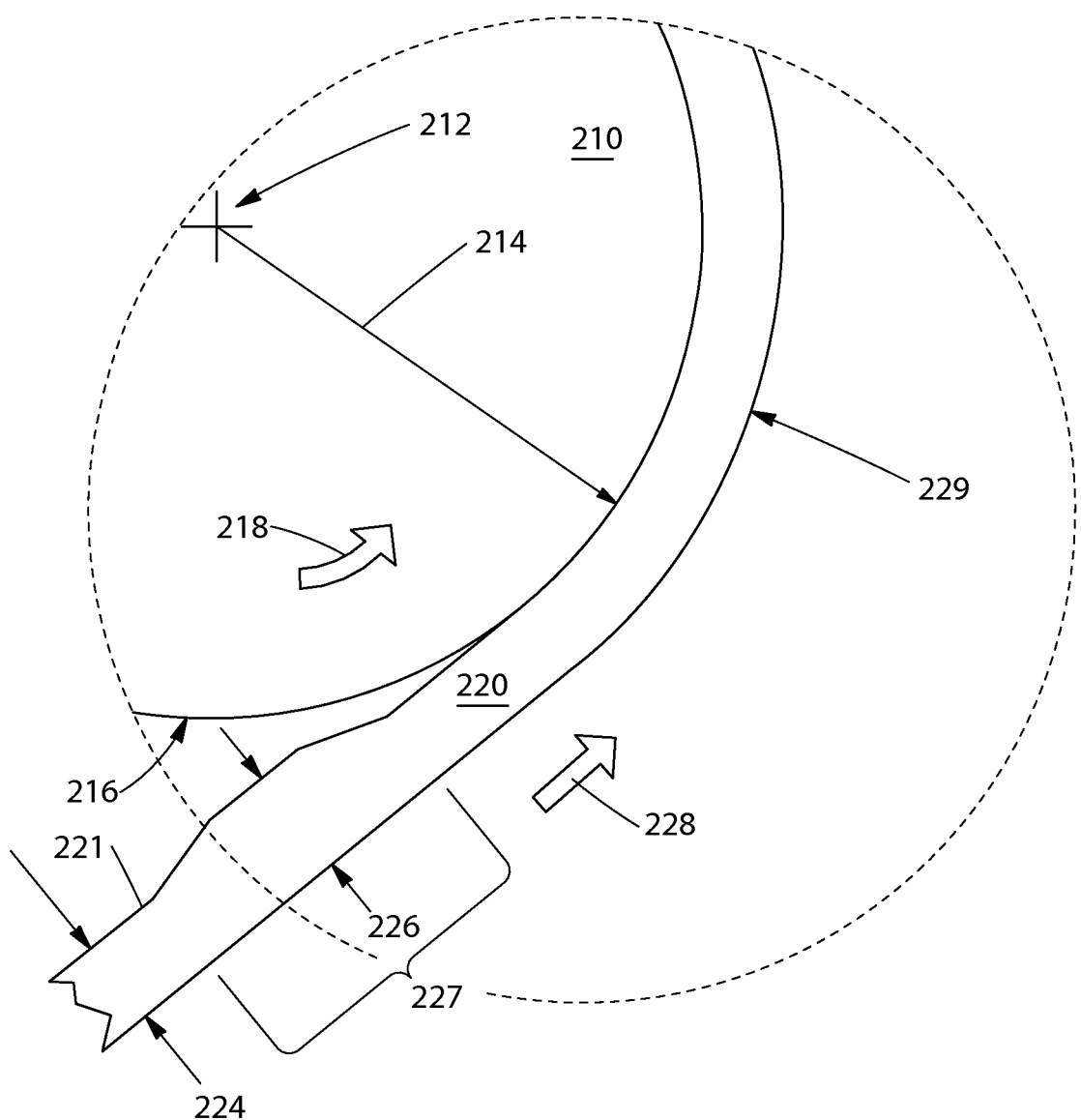
FIG. 2B is an enlarged view of a portion of FIG. 2A.

FIG. 2B is an enlarged view of FIG. 2A. For clarity, portions of the roller 210 and portions of the web 220 are shown as broken away. The roller 210 has the contact surface 216 that is spaced apart from the axis 212 by a radius 214. The web 220 has a first surface 221 and a second surface 229. The first surface 221 is configured to come into contact with the contact surface 216 of the roller 210 as the web 220 and the roller 210 move.

The web 220 has variations in thickness in the machine direction, which is the direction of the travel of the web 220. The web 220 has a first thickness 224 for most of the web, but the web 220 also has a thicker portion 227 with a second thickness 226 that is greater than the first thickness 224. In various embodiments, a web can include one or more thicker portions and/or one or more thinner portions, with variations in the machine direction and/or the cross direction.

Figure 2C:
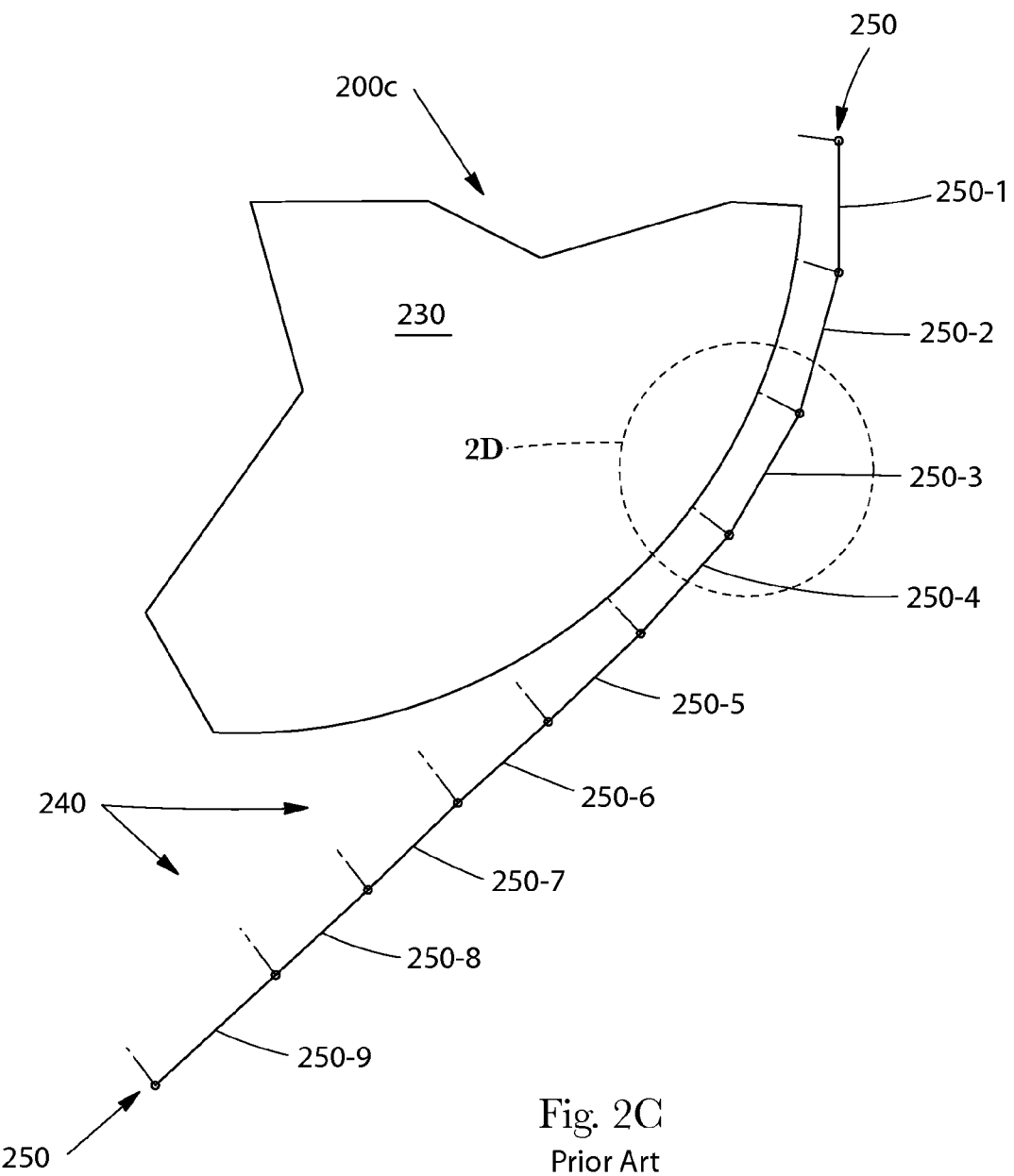
FIG. 2C is a side plan view illustrating a prior art computer based model representing a web moving and interacting with a contact surface on a roller.

FIG. 2C is a side plan view illustrating a prior art approach to modeling at least a portion of a web of material interacting with at least a portion of a contact surface of a roller, similar to the embodiment of FIG. 2B, however, in the model of FIG. 2C, the web has a uniform thickness. For clarity, portions of the roller and portions of the web are shown as broken away. The approach includes a computer based model 200c including a model of a web 240 that is moving and interacting with a model of a roller 230. The model of the web 240 includes a layer 250. The layer 250 includes elements 250-1 through 250-9, which are aligned end to end. These elements are offset from the model of the roller 230 to represent a layer of the material of the web.

Figure 2D:
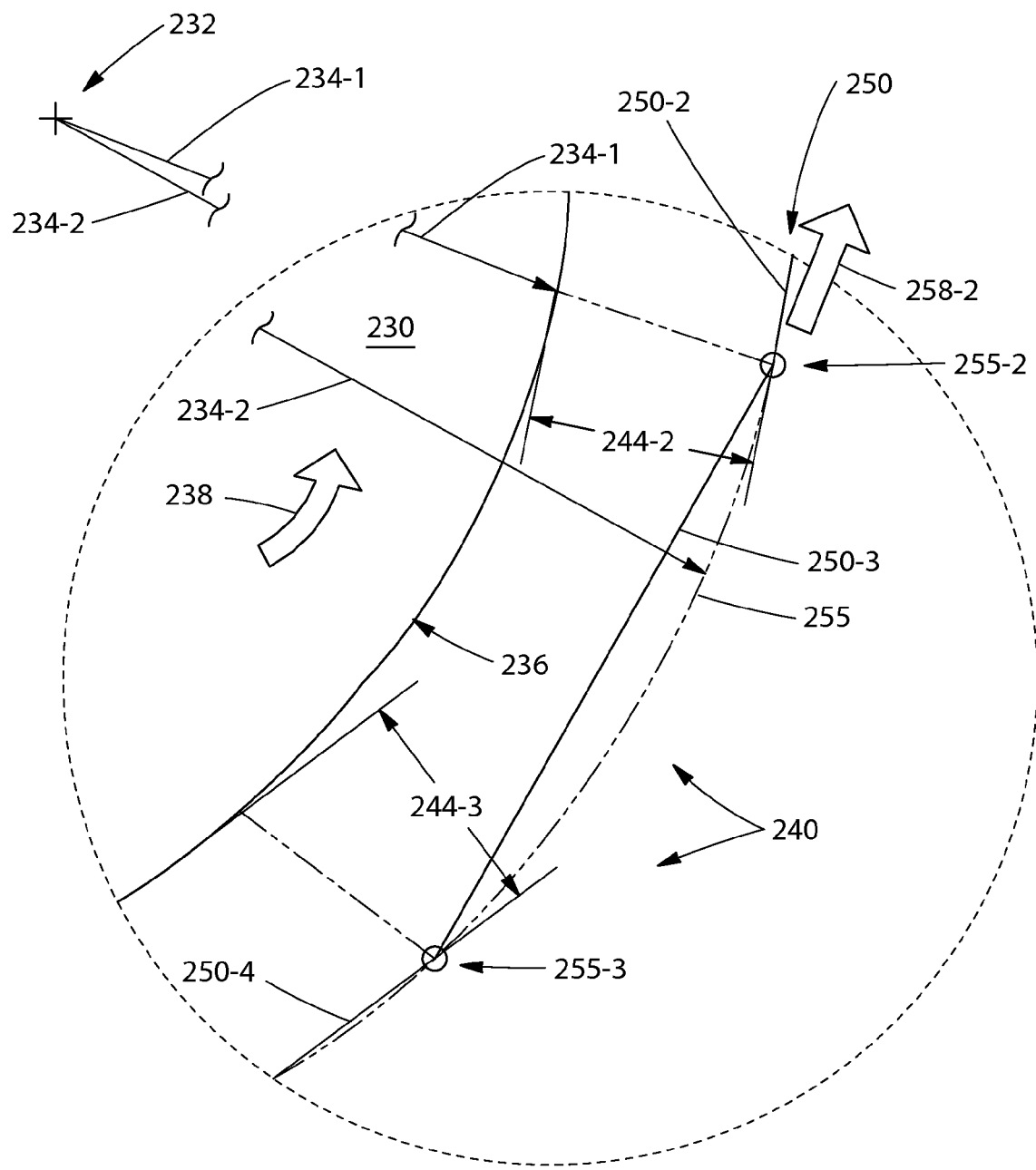
FIG. 2D is an enlarged view of a portion of FIG. 2C.

FIG. 2D is an enlarged view of a portion of the prior art approach of FIG. 2C. The model of the roller 230 has a contact surface 236 that is spaced apart from an axis 232 by a radius 234-1. The contact surface 236 can be configured in various ways. For example, the contact surface 236 can be configured as one or more rigid objects, one or more analytical rigid surfaces, one or more solid elements, etc. The model of the roller 230 rotates around the axis 232 with an angular velocity 238.

FIG. 2D illustrates a side view of a portion of element 250-2, element 250-3, and a portion of element 250-4 in the model 240. The elements 250-1 through 250-9 are shell elements. Each of the elements 250-1 through 250-9 is defined by nodes. The element 250-3 is defined by nodes 255-2 and 255-3 and one or more additional nodes (not shown) in the cross-direction, which is perpendicular with the page. The node 255-2 is offset from the contact surface 236 by offset distance 244-2. The node 255-3 is offset from the contact surface 236 by offset distance 244-3. In the embodiment of FIG. 2D, the offset distances are the same and are equal to half of the thickness of the web. As a result, the nodes 255-2 and 255-3 are in the midplane of the web.

In the embodiment of FIG. 2D, if the shell elements of the model of the web 240 are in traction (no slip) with the contact surface 236 of the model of the roller 230 as the model of the roller 230 is rotating, then each node of the elements will have an instantaneous velocity that matches the instantaneous velocity at the contacting surface 236.

For a location on a rotating object, the instantaneous velocity of that location is equal to the angular velocity of the rotation times the distance from that location to the axis of rotation. For a round roller, the instantaneous velocity at the contact surface is equal to the angular velocity times the radius of the roller. So, in the embodiment of FIG. 2D, the instantaneous velocity at the contact surface 236 is equal to the angular velocity 238 times the radius 234-1. The instantaneous velocity 258-2 of the node 255-2 is equal to this instantaneous velocity at the contact surface 236. However, this is an incorrect representation, since it does not account for the offset distance 244-2. The nodes of the elements are actually at an effective radius 234-2, represented by the circular reference segment 255. The effective radius 234-2 is the radius 234-1 plus the offset distance 244-2. Since the instantaneous velocity 258-2 of the node 255-2 is being based on an incorrectly small radius 234-1, the instantaneous velocity 258-2 will be incorrectly smaller than it should be. For a moving web, this incorrect velocity causes an error in the position of the web. As the web moves, this error accumulates over time and can become significant, such that the web becomes improperly positioned, misaligned, and/or out-of-phase with respect to processes, equipment, and/or materials that are joined to the web (e.g. other webs of material).

One possible solution to this problem would be to offset the shell surface from one of the surfaces of the web. Then when the web would be contacting the roller, the roller surface speed and the speed of the shell element at the surface would be matched and accurately represented. However, there is a problem with this approach if another roller contacts the other side of the web, such as with a pair of rollers with an S-shaped thread up of a web. In this case the web surface speed at one of the rollers in the pair would be incorrect.

Another possible solution to this problem would be to increase the radius of the roller to account for the thickness error. That is, the roller radius would be increased by the offset distance. This could work if the web was of uniform thickness, however it would not work in many scenarios in which there are variations in the thickness of the web, either in the machine direction or the cross direction, as it would be very difficult to continuously adjust the radius of the roller to account for this variation.

The embodiments of FIGS. 2E-2H describe the invention of the present disclosure, which is a better solution to the problem described above. This solution involves creating and using computer based models with contact objects on either or both sides of carrier elements. The contact objects are intended to interact with contact surfaces. These contact objects are located at the surface of the web and are joined, either directly or indirectly, in a defined positional relationship to the mesh of the carrier elements to maintain the proper offset distance. That is, the locations of the nodes of the carrier elements are defined by the locations of the contact objects. As a result, the carrier elements no longer need to contact the contact surface. When the web is in traction with the contact surface, the contact objects in traction will correctly match the velocity of the roller surface. Since the carrier elements are joined to the contact objects, the velocities at the carrier elements are properly represented, regardless of whether or not the web has a uniform thickness, in the cross-direction and/or the machine direction.

The models in the embodiments of FIG. 2E-2H are described and illustrated with the web configured as a sheet-like material and the roller configured as a cylindrical roller, however this particular configuration is not required. The model of the web can be any model in any configuration that represents a web, including any configuration disclosed herein. The model of the roller can be any model in any configuration that represents a roller, including any configuration disclosed herein.

Figure 2E:
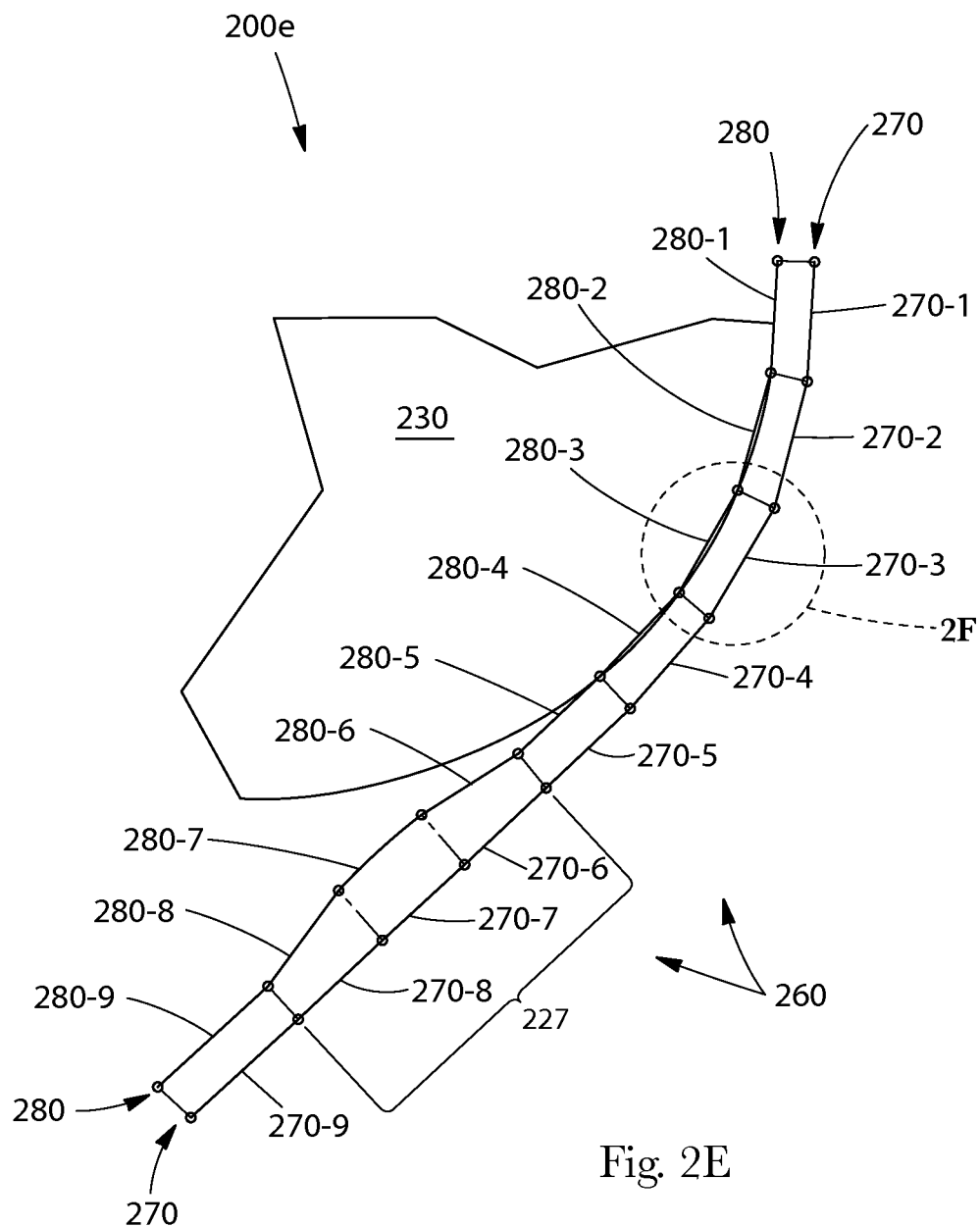
FIG. 2E is a side plan view illustrating a computer based model of the present disclosure representing a web having varying thickness in the machine direction with a model of the web having a carrier layer and a contact layer.

FIG. 2E is a side plan view illustrating a computer based model 200e representing a portion of the web and a portion of the roller of FIGS. 2A and 2B. The computer based model 200e includes a model of the web 260 that is moving and interacting with a model of the roller 230. The model of the roller 230 in FIG. 2E is configured in the same way as the model of the roller 230 of the embodiment of FIG. 2C. The model of the web 260 includes a carrier layer 270 and a contact layer 280. The carrier layer 270 includes carrier elements 270-1 through 270-9, which are connected and aligned end to end. The contact layer 280 includes contact objects 280-1 through 280-9, which are connected and aligned end to end. The contact layer 280 represents a first surface of the web of material. Together the carrier layer 270 and the contact layer 280 form a layer of the material. The model of the web 260 also has a thicker portion 227, which represents the thicker portion 227 of the web 220 from FIG. 2B. The model of the web 260 represents half of the thickness of the web, as explained below.

Figure 2F:
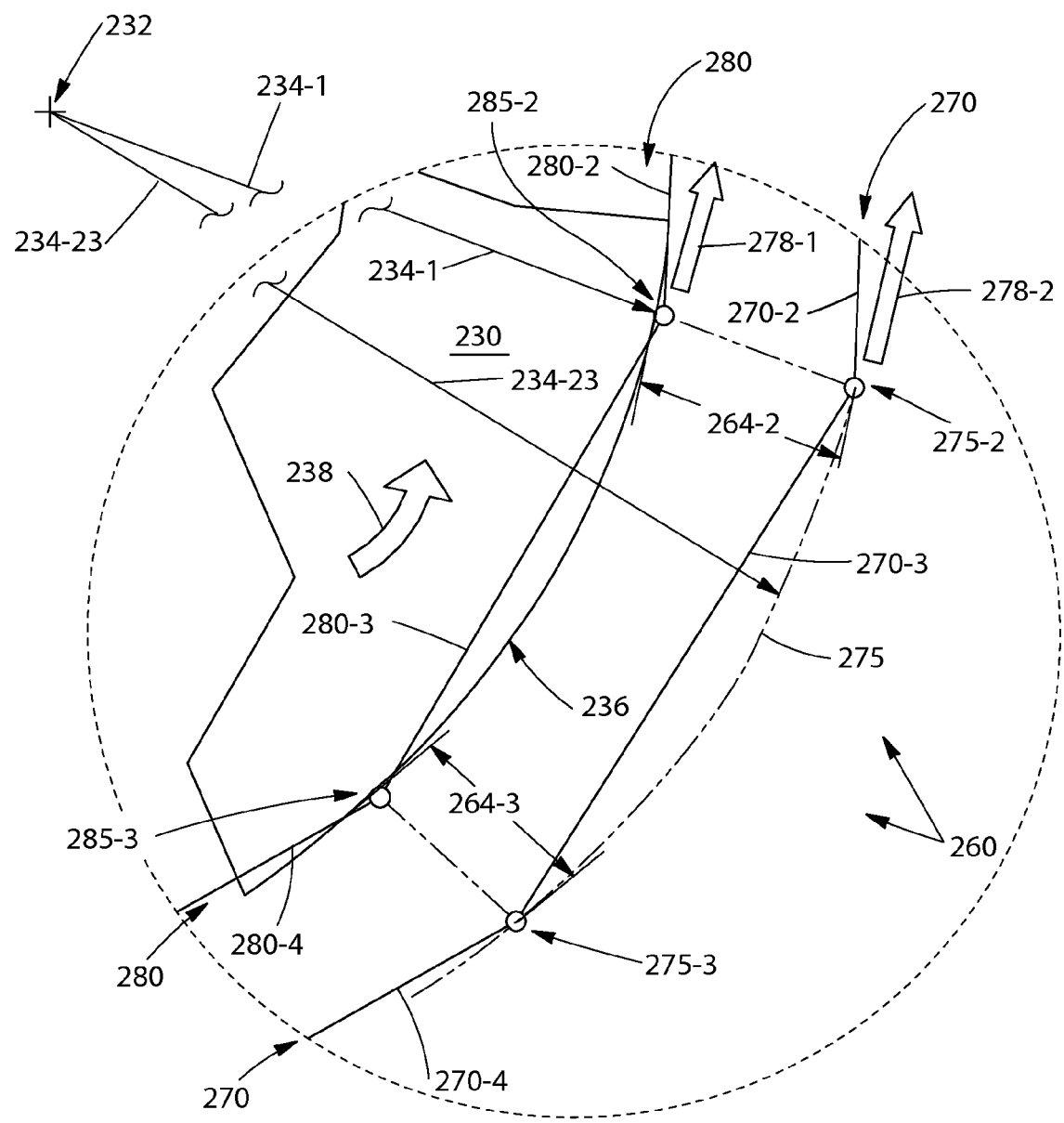
FIG. 2F is an enlarged view of a portion of FIG. 2E.

FIG. 2F is an enlarged view of a portion of FIG. 2E. In the embodiment of FIG. 2F, the model of the roller 230 has a contact surface 236 that is spaced apart from an axis 232 by a radius 234-1. The roller rotates around the axis 232 with an angular velocity 238.

FIG. 2F illustrates a portion of the carrier layer 270, including a portion of carrier element 270-2, the carrier element 270-3, and a portion of carrier element 270-4. Since FIG. 2F is a side view, only one side of each of these elements is shown. The carrier elements 270-1 through 270-9 are shell elements, however in various embodiments these carrier elements can be one or more other kinds of elements, such as solid elements, membrane elements, truss elements, etc. Each of the carrier elements 270-1 through 270-9 is defined by nodes. The carrier element 270-3 is defined by nodes 275-2, 275-3 and one or more additional nodes (not shown) in the cross-direction, which is perpendicular with the page. The additional nodes define other sides (not shown) of the carrier element.

FIG. 2F also illustrates a portion of the contact layer 280, including a portion of contact object 280-2, the contact object 280-3, and a portion of contact object 280-4. Again, since FIG. 2F is a side view, only one side of each of these contact objects is shown. The contact objects 280-1 through 280-9 are contact elements, however in various embodiments these contact objects can be one or more other kinds of objects, such as one or more point clouds, etc. Each of the objects 280-1 through 280-9 is defined by nodes. The contact element 280-3 is defined by nodes 285-2, 285-3, and one or more additional nodes (not shown) defining other sides of the contact element, as described above.

The nodes 285-2 and 285-3 are located on the contact layer 280, and these nodes are touching the contact surface 236. In the embodiment of FIG. 2F, if the contact elements of the model of the web 260 are in traction with the contact surface 236 of the model of the roller 230 as the model of the roller 230 is rotating, then each node on the contact layer 280 that is touching the contact surface 236 will have an instantaneous velocity that matches the instantaneous velocity at the contacting surface 236. So, in the embodiment of FIG. 2F, the instantaneous velocity at the contact surface 236 is equal to the angular velocity 238 times the radius 234-1. The instantaneous velocity 278-1 of the node 285-2 on the contact layer 280 is equal to this instantaneous velocity at the contact surface 236. Since the node 285-3 is also touching the contact surface 236, the node 285-3 has the same instantaneous velocity as the node 285-2. In various embodiments, the model of the web 260 can also include a second contact layer on the opposite side of the carrier layer 270, configured in the same way as the first contact layer 280, for contacting one or more other contact surfaces on that opposite side, as will be understood by one of ordinary skill in the art.

The contact layer 280 is joined to the carrier layer 270. The carrier layer 270 is offset from the contact layer 280, to maintain the proper offset distance between the carrier layer 270 and the contact surface 236. This offset distance is set between the layers' corresponding nodes.

The nodes 275-2 and 275-3 are located on the carrier layer 270. For node 275-2, the proper offset distance, as measured to its corresponding node 285-2, is the offset distance 264-2. Since the node 285-2 is touching the contact surface 236, the node 275-2 is offset from the contact surface 236 by the offset distance 264-2. For node 275-3, the proper offset distance, as measured to its corresponding node 285-3, is the offset distance 264-3. Since the node 285-3 is touching the contact surface 236, the node 275-3 is offset from the contact surface 236 by the offset distance 264-3. In the embodiment of FIG. 2F, the offset distances 264-2 and 264-3 are the same. However, in various embodiments, the offset distances of the nodes of a carrier element may differ.

In the embodiment of FIG. 2F, the offset distances are equal to half of the thickness of the web. As a result, the nodes 275-2 and 275-3 are in the midplane of the web. However, in various embodiments, one or more of the offset distances of the nodes of a carrier element may be selected to be one or more other particular values.

The nodes 275-2 and 275-3 are at an effective radius 234-23, represented by the circular reference segment 275. The effective radius 234-23 is the radius 234-1 plus the offset distance 264-2 or 264-3. In the embodiment of FIG. 2F, in the traction condition, for each node on the carrier layer 270 that has a corresponding node on the contact layer 280 touching the contact surface 236, that node on the carrier layer 270 will have an instantaneous velocity that is equal to the angular velocity 238 times its effective radius. The instantaneous velocity 278-2 of the node 275-2 is equal to the angular velocity 238 times the effective radius 234-23. Since the nodes 275-2 and 275-3 are at the same effective radius 234-23, the nodes 275-2 and 275-3 have the same instantaneous velocity 278-2. This is a correct representation, since it accounts for the offset distances 264-2 and 264-3. As a result of the modeling approach of the embodiment of FIG. 2F, the velocities at the carrier elements are properly represented.

Figure 2G:
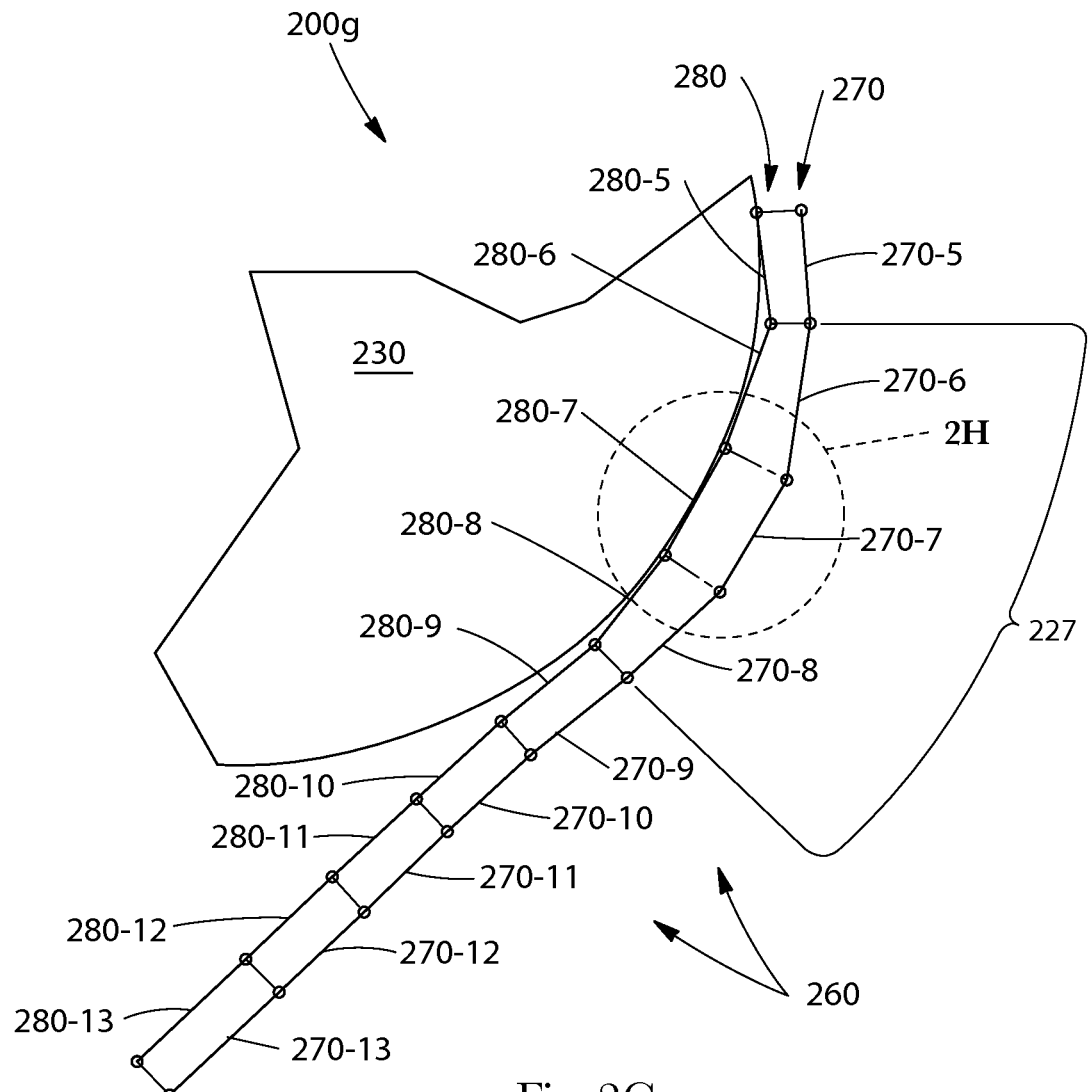
FIG. 2G is a variation of FIG. 2E, with the web in a different position.

FIG. 2G is a variation of FIG. 2E, with the web 220 in a different position. In FIG. 2G, the web 220 has advanced so the thicker portion 227 of the web 220 is in contact with the contact surface 236 of the roller 230. Since the web 220 has advanced, different elements are shown for the portions of the carrier layer 270 and the contact layer 280.

Figure 2H:
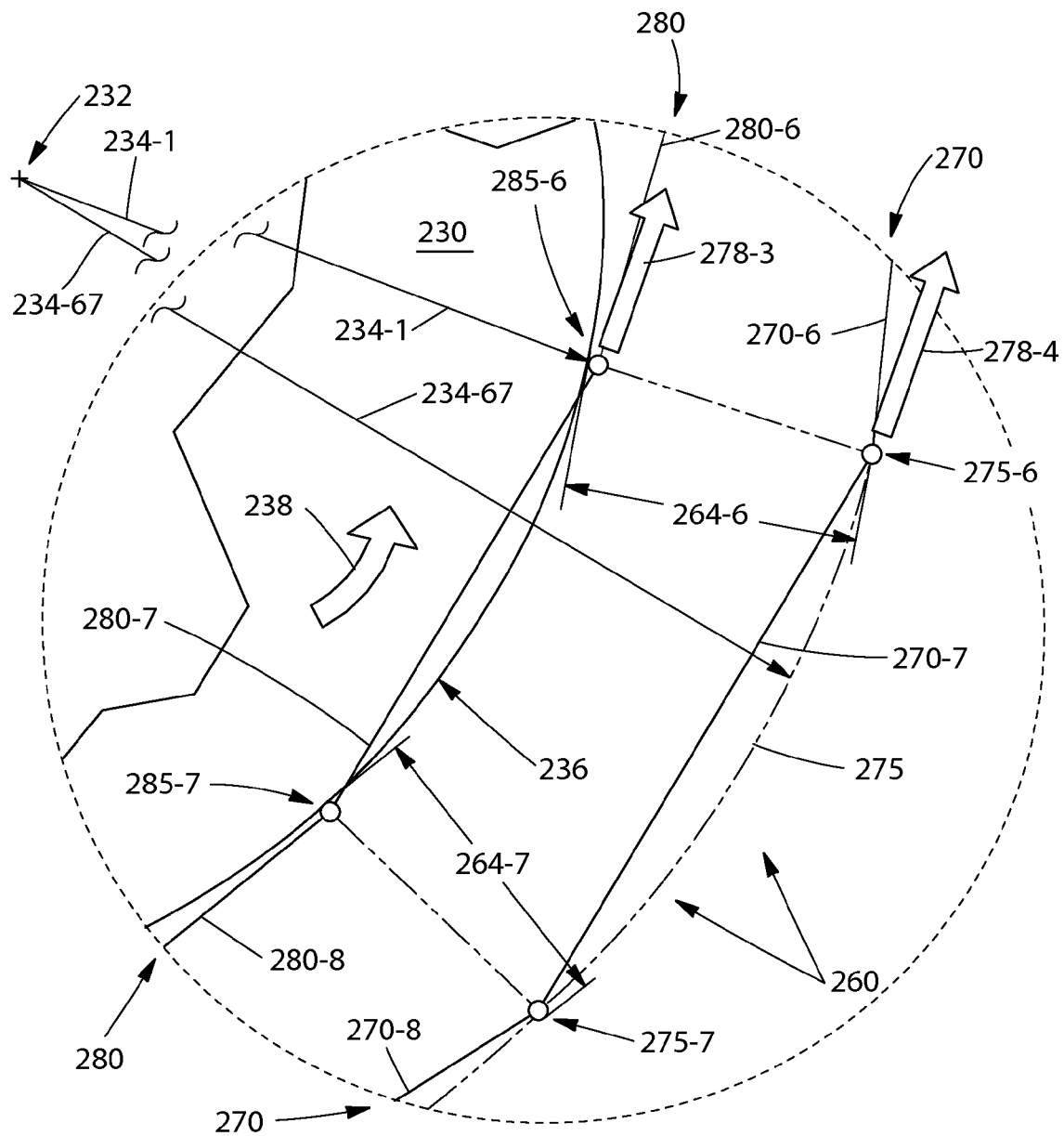
FIG. 2H is an enlarged view of a portion of FIG. 2G.

FIG. 2H is an enlarged view of a portion of FIG. 2G. FIG. 2H illustrates the same general relationships illustrated in FIG. 2F, except that different elements are shown. On the carrier layer 270, a portion of carrier element 270-6, the carrier element 270-7, and a portion of carrier element 270-8 are shown, with carrier element 270-7 having nodes 275-6 and 275-7. On the contact layer 280, a portion of contact element 280-6, the contact element 280-7, and a portion of contact element 280-8 are shown, with contact element 280-7 having nodes 285-6 and 285-7. The nodes 285-6 and 285-7 are touching the contact surface 236. The node 275-6 is offset from its corresponding node 285-6 and from the contact surface 236 by offset distance 264-6. The node 275-7 is offset from its corresponding node 285-7 and from the contact surface 236 by offset distance 264-7. In the embodiment of FIG. 2H, the offset distances 264-6 and 264-7 are the same.

In the embodiment of FIG. 2H, if the contact elements of the model of the web 260 are in traction with the contact surface 236 of the model of the roller 230 as the model of the roller 230 is rotating, then an instantaneous velocity 278-3 of the node 285-6 on the contact layer 280 is equal to the instantaneous velocity at the contact surface 236. Since the node 285-7 is also touching the contact surface 236, the node 285-7 has the same instantaneous velocity as the node 285-6.

Since the elements in FIG. 2H represent part of the thicker portion 227 of the web, the offset distances 264-6 and 264-7 are larger than the offset distances 264-2 and 264-3. Thus, the nodes 275-6 and 275-7 are at a larger effective radius 234-67. In the embodiment of FIG. 2H, in the traction condition, for each node on the carrier layer 270 that has a corresponding node on the contact layer 280 touching the contact surface 236, that node on the carrier layer 270 will have an instantaneous velocity that is equal to the angular velocity 238 times its effective radius. The instantaneous velocity 278-4 of the node 275-6 is equal to the angular velocity 238 times the effective radius 234-67. Since the nodes 275-6 and 275-7 are at the same effective radius 234-67, the nodes 275-6 and 275-7 have the same instantaneous velocity 278-4. This is a correct representation, since it accounts for the offset distances 264-6 and 264-7. As a result of the modeling approach of the embodiment of FIG. 2H, the velocities at the carrier elements are properly represented, even though the web does not have a uniform thickness in the machine direction.

Figure 3A:
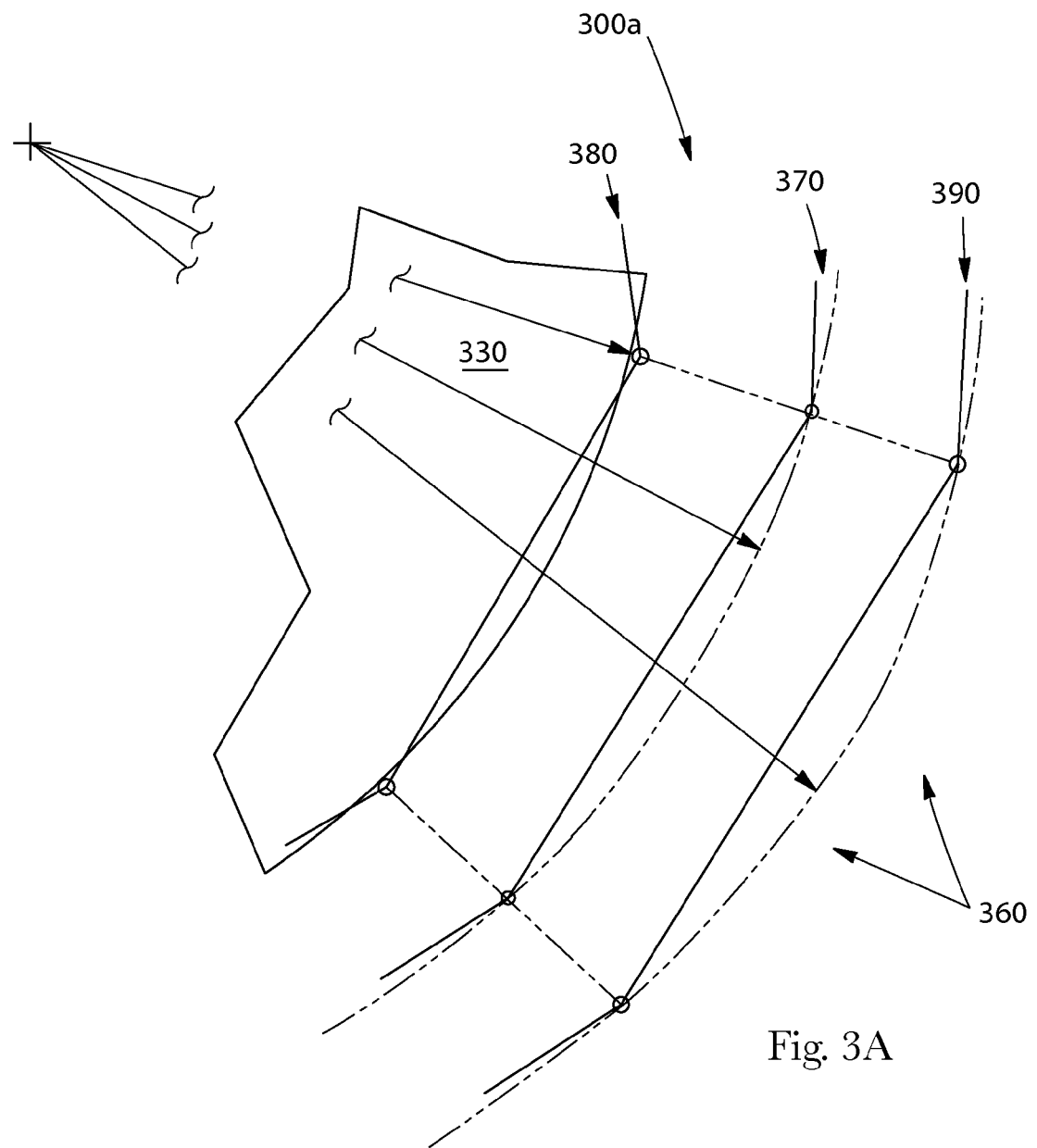
FIG. 3A is a side plan view illustrating a computer based model of the present disclosure representing a web having varying thickness in the machine direction with a model of the web having a carrier layer and two contact layers.

FIG. 3A is a side plan view illustrating a computer based model 300a of the present disclosure representing a portion of a web having varying thickness in the machine direction with a model of the web 360 having a carrier layer 370 and two contact layers 380 and 390, wherein the model of the web 300a is moving and interacting with a model of a roller 330. The parts of the model 360 are configured in the same way as the like-numbered parts in the model 260 of the embodiment of FIG. 2F, but with the addition of the second contact layer 390, which is configured in the same way as the first contact layer 380, but on the opposite side of the carrier layer 370. The model of the roller 330 is configured in the same way as the model of the roller 230 of the embodiment of FIG. 2F. By having a contact layer on each side, the model of the web 360 can appropriately contact one or more contact surfaces on either side and/or both sides of the web, to provide correct velocities in the model of the web 360. For example, the model of the web 360 can be used in a scenario where one roller contacts one side of the web and another roller contacts the other side of the web, such as with a pair of rollers with an S-shaped thread up of a web.

Figure 3B:
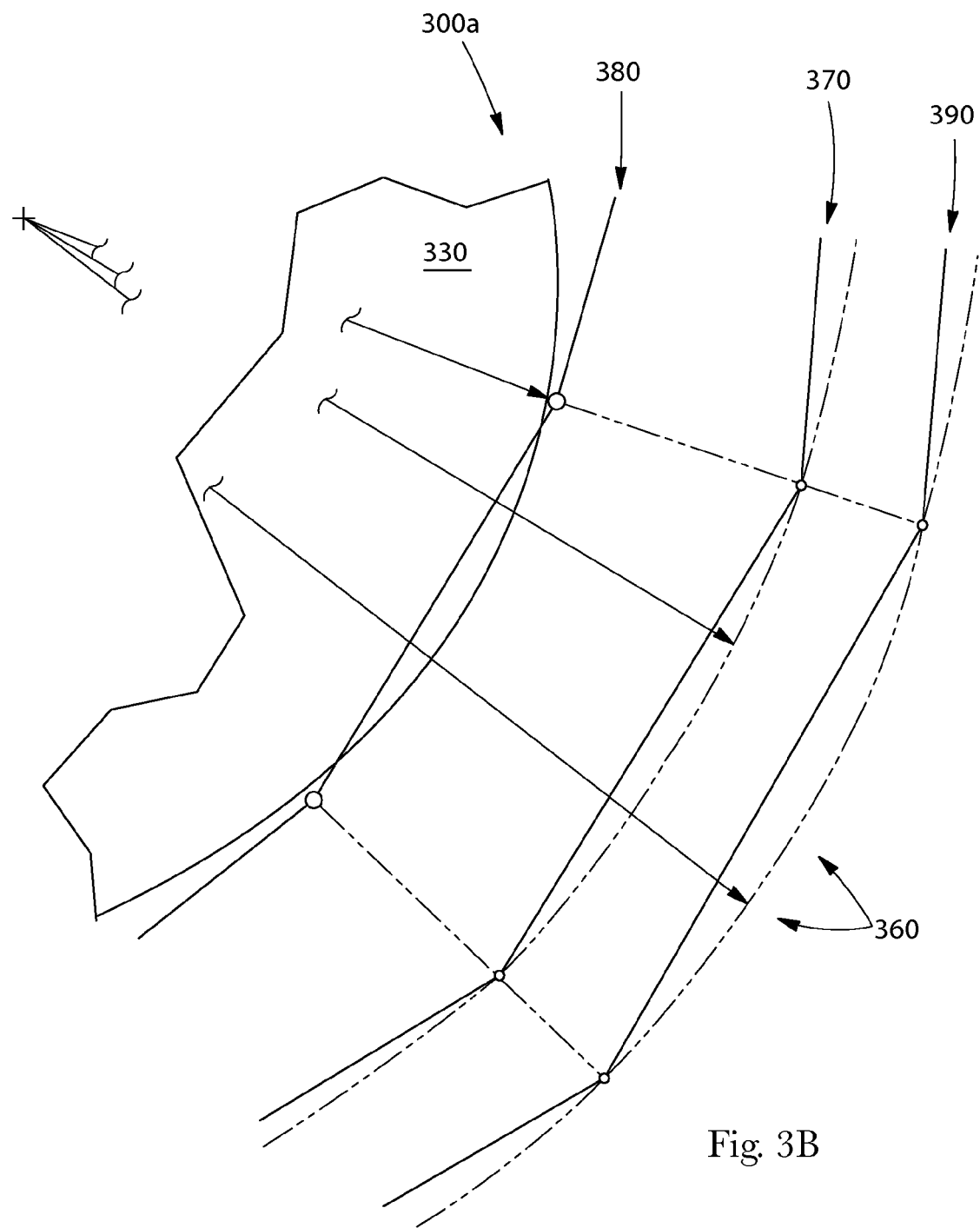
FIG. 3B is a variation of FIG. 3A, with the web in a different position.

FIG. 3B is a variation of FIG. 3A, with the web in a different position; part of a thicker portion of the web is shown contacting the roller 330. In the position shown in FIG. 3B, the model of the web 360 can still appropriately contact one or more contact surfaces on either side and/or both sides of the web, to provide correct velocities in the model of the web 360.

Figure 4A:
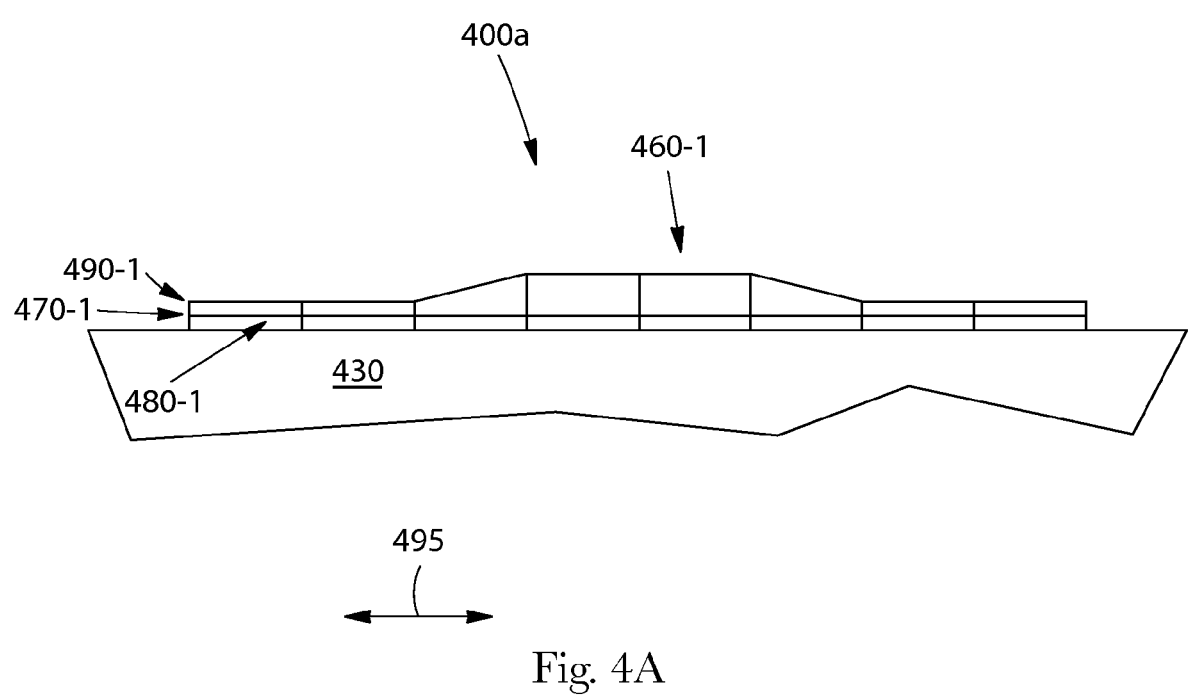
FIG. 4A is an end view illustrating a first embodiment of a computer based model of the present disclosure representing a web having varying thickness in the cross direction with a model of the web having a carrier layer and two contact layers.
Figure 4B:
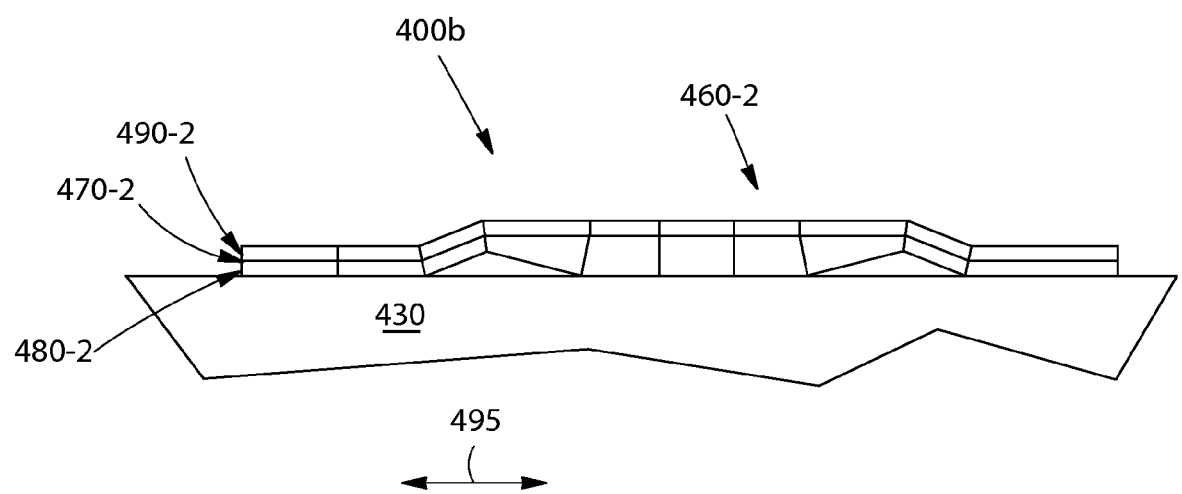
FIG. 4B is an end view illustrating a second embodiment of a computer based model of the present disclosure representing a web having varying thickness in the cross direction with a model of the web having a carrier layer and two contact layers.

FIG. 4A is an end view illustrating a first embodiment of a computer based model 400a of the present disclosure representing a portion of a web having varying thickness in the cross direction 495 with a model of the web 460-1 having a carrier layer 470-1 and two contact layers 480-1 and 490-1, wherein the model of the web 400a is moving and interacting with a model of a roller 430. The parts of the model 460-1 are configured in the same way as the like-numbered parts in the model 360 of the embodiment of FIG. 3A, but with variation in thickness in the cross-direction 495, wherein the variation in thickness is on the side of the web that is not contacting the roller. The model of the roller 430 in FIG. 4B is configured in the same way as the model of the roller 330 of the embodiment of FIG. 3A. As with the model 300a of FIG. 3A, the model 400a of FIG. 4A can appropriately contact one or more contact surfaces on either side and/or both sides of the web, to provide correct velocities in the model of the web 460-1.

FIG. 4B is an end view illustrating a second embodiment of a computer based model 400b of the present disclosure representing a portion of a web having varying thickness in the cross direction 495 with a model of the web 460-2 having a carrier layer 470-2 and two contact layers 480-2 and 490-2, wherein the model of the web 400a is moving and interacting with a model of a roller 430. The parts of the model 460-2 are configured in the same way as the like-numbered parts in the model 360 of the embodiment of FIG. 3A, but with variation in thickness in the cross-direction 495, wherein the variation in thickness is on the side of the web that is not contacting the roller. The model of the roller 430 in FIG. 4B is configured in the same way as the model of the roller 330 of the embodiment of FIG. 3A. As with the model 300a of FIG. 3A, the model 400b of FIG. 4B can appropriately contact one or more contact surfaces on either side and/or both sides of the web, to provide correct velocities in the model of the web 460-2.

Each of the computer based models described herein can be created as described below, with general references to a computer based model. A computer based model that represents a web or a contact surface can be created by providing dimensions and material properties to modeling software and by generating a mesh using meshing software.

A computer based model can be created with dimensions that are similar to or the same as dimensions that represent parts of a real world object or structure. These dimensions can be determined by measuring actual samples, by using known values, or by estimating values. Alternatively, a model can be configured with dimensions that do not represent a real world object or structure. For example, a model can represent a new variation of a thing or can represent an entirely new thing. In these examples, dimensions for the model can be determined by varying actual or known values, by estimating values, or by generating new values. The model can be created by putting values for the dimensions of parts of the object or structure into the modeling software.

The computer based model can be created with material properties that are similar to or the same as material properties that represent a real object or structure. These material properties can be determined by measuring actual samples, by using known values, or by estimating values. Alternatively, a model can be configured with material properties that do not represent reality. For example, a model can represent a new variation of a thing or can represent an entirely new thing. In these examples, material properties for the model can be determined by varying actual or known values, by estimating values, or by generating new values.

The computer based model of the absorbent article can be created with a mesh for the parts of the article. A mesh is a collection of small, connected polygon shapes that define the set of discrete elements in a CAE computer based model. The type of mesh and/or the size of elements can be controlled with user inputs into the meshing software, as will be understood by one of ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method comprising:
representing a web of material with a computer based model of the web, wherein the model includes a first web contact layer with first contact objects and a carrier layer with carrier elements, wherein the first web contact layer is joined to the carrier layer;
representing a first contact surface with a computer based model of the first contact surface;
transforming the computer based model of the web, by modeling a physical behavior of the web as the web moves and as at least a portion of the web interacts with at least a portion of the first contact surface, to form a transformed web; and
representing the transformed web with a computer based model of the transformed web.

2. The method of claim 1, wherein the representing of the web of material includes representing the web of material with the computer based model of the web, wherein the carrier objects are solid elements.

3. The method of claim 1, wherein the representing of the web of material includes representing the web of material with the computer based model of the web, wherein the carrier objects are shell elements.

4. The method of claim 1, wherein the representing of the web of material includes representing the web of material with the computer based model of the web, wherein the carrier objects are membrane elements.

5. The method of claim 1, wherein the representing of the web of material includes representing the web of material with the computer based model of the web, wherein the first contact objects are contact elements.

6. The method of claim 1, wherein the representing of the web of material includes representing the web of material with the computer based model of the web, wherein the first contact objects are one or more point clouds.

7. The method of claim 1, wherein the representing of the web of material includes representing the web of material with the computer based model of the web, wherein the first web contact layer is directly connected to the carrier layer.

8. The method of claim 1, wherein the representing of the web of material includes representing the web of material that has a particular thickness with the computer based model of the web, wherein the first contact layer is spaced apart from the carrier layer by a first offset distance that is based on the particular thickness.

9. The method of claim 1, wherein the representing of the web of material includes representing the web of material that has a particular thickness with the computer based model of the web, wherein the first contact layer is spaced apart from the carrier layer by a first offset distance that is equal to half of the particular thickness.

10. The method of claim 1, wherein the representing of the web of material includes representing the web of material that has a thickness that is non-uniform in the cross-direction.

11. The method of claim 1, wherein the representing of the web of material includes representing the web of material that has a thickness that is non-uniform in the machine-direction.

12. The method of claim 1, wherein the representing of the web of material includes representing the web of material as having a plurality of discrete areas, wherein each of areas has a thickness that differs from the thickness of a surrounding portion of the web, and each of the areas has an overall width that is less than an overall width of the web.

13. The method of claim 1, wherein the representing of the first contact surface includes representing the first contact surface with the computer based model of the first contact surface, wherein the model includes one or more rigid objects.

14. The method of claim 13, wherein the representing of the first contact surface includes representing the first contact surface with the computer based model of the first contact surface, wherein the one or more rigid objects are one or more analytical rigid surfaces.

15. The method of claim 13, wherein the representing of the first contact surface includes representing the first contact surface with the computer based model of the first contact surface, wherein the one or more rigid objects are one or more solid elements.

16. The method of claim 1, wherein the representing of the first contact surface includes representing the first contact surface with the computer based model of the first contact surface, wherein the first contact surface is non-planar.

17. The method of claim 1, wherein the representing of the first contact surface includes representing the first contact surface with the computer based model of the first contact surface, wherein the first contact surface is convex with respect to the web.

18. The method of claim 1, wherein the representing of the first contact surface includes representing the first contact surface with the computer based model of the first contact surface, wherein the first contact surface is selected from the group including:
- a surface of a first roller,
- a surface of a conveyor,
- a surface of a folding board, and
- a surface of a web guide.

19. The method of claim 1, wherein the transforming of the computer based model of the web includes transforming the computer based model of the web, by modeling a physical behavior of the web as the at least a portion of the web mechanically interacts with the at least a portion of the first contact surface, to form the transformed web.

20. The method of claim 1, wherein the transforming of the computer based model of the web includes transforming the computer based model of the web, by modeling a physical behavior of the web as the at least a portion of the web contacts the at least a portion of the first contact surface, to form the transformed web.

21. The method of claim 1, wherein the representing of the web of material includes representing the web of material that has a particular thickness with the computer based model of the web, wherein the first contact layer is spaced apart from the carrier layer by one or more fixed distances.

22. The method of claim 21, wherein the transforming of the computer based model of the web includes transforming the computer based model of the web, while the one or more fixed distances remain constant.

23. The method of claim 1, wherein the representing of the web of material includes representing the web of material that has a particular thickness with the computer based model of the web, wherein the first contact layer is spaced apart from the carrier layer by a single fixed distance.

24. The method of claim 23, wherein the transforming of the computer based model of the web includes transforming the computer based model of the web, while the single fixed distance remains constant.

25. The method of claim 1, wherein the transforming of the computer based model of the web includes transforming the computer based model of the web, using variable open-form boundary conditions, by modeling a physical behavior of the web as the web wrinkles, to form the transformed web.

26. The method of claim 1 including representing a second contact surface with a computer based model of the second contact surface, and wherein:
the representing of the web of material includes representing the web of material with the computer based model of the web, wherein the model includes a second web contact layer with second contact objects and the second contact layer is joined to the carrier layer;
the transforming of the computer based model of the web includes transforming the computer based model of the web by modeling a physical behavior of the web as the web moves and as at least a portion of the web contacts at least a portion of the second contact surface, wherein at least some of the second contact objects are contacting the model of the second contact surface, to form the transformed web; and
representing the transformed web with a computer based model of the transformed web.

27. The method of claim 26, wherein the representing of the web of material includes representing the web of material that has a particular thickness with the computer based model of the web, wherein the second contact layer is spaced apart from the carrier layer by a second offset distance that is based on the particular thickness.

28. A non-transitory computer readable medium having instructions for causing a device to perform a method, the method comprising:
representing a web of material with a computer based model of the web, wherein the model includes a first contact layer with first contact objects and an carrier layer with carrier elements, wherein the first contact layer is joined to the carrier layer;
representing a first contact surface with a computer based model of the first contact surface;
transforming the computer based model of the web, by modeling a physical behavior of the web as the web moves and as at least a portion of the web contacts at least a portion of the first contact surface, wherein at least some of the first contact objects are contacting the model of the first contact surface, to form a transformed web; and
representing the transformed web with a computer based model of the transformed web.

29. The non-transitory computer readable medium of claim 28, wherein the method includes representing a second contact surface with a computer based model of the second contact surface, and wherein:
the representing of the web of material includes representing the web of material with the computer based model of the web, wherein the model includes a second contact layer with second contact objects and the second contact layer is joined to the carrier layer;
the transforming of the computer based model of the web includes transforming the computer based model of the web by modeling a physical behavior of the web as the web moves and as at least a portion of the web contacts at least a portion of the second contact surface, wherein at least some of the second contact objects are contacting the model of the second contact surface, to form the transformed web; and
representing the transformed web with a computer based model of the transformed web.

* * * * *